United States Patent [19]

Saito et al.

[11] Patent Number: 4,799,068

[45] Date of Patent: Jan. 17, 1989

[54] THERMAL ELECTROSTATIC INK-JET RECORDING METHOD AND AN INK THEREFOR

[75] Inventors: Koichi Saito; Eiichi Akutsu; Yoshihiko Fujimura; Nanao Inoue, all of Kanagawa, Japan

[73] Assignee: Fuji Xerox Co., Ltd., Tokyo, Japan

[21] Appl. No.: 59,507

[22] Filed: Jun. 8, 1987

[30] Foreign Application Priority Data

Jun. 10, 1986 [JP] Japan .................................... 134439

[51] Int. Cl.⁴ ............................................ G01D 9/00

[52] U.S. Cl. .................................... 346/1.1; 346/140; 400/126

[58] Field of Search .................. 346/1.1, 75, 140 PD, 346/140 R, 139 R, 153.1, 155, 159; 400/126; 106/22, 27, 28

[56] References Cited

FOREIGN PATENT DOCUMENTS 0174464 10/1983 Japan .................................... 106/22

0174468 10/1983 Japan .................................... 106/22

*Primary Examiner*—E. A. Goldberg

*Assistant Examiner*—Huan H. Tran

*Attorney, Agent, or Firm*—Finnegan, Henderson, Farabow, Garrett, & Dunner

[57] ABSTRACT

A method and an ink for use in thermal electrostatic ink-jet recording wherein the ink has appropriate physical properties, i.e. density, viscosity and surface tension in relation to the gap to which the electric field is applied and the density of air to make it possible to readily set conditions in the recording head which are appropriate for jetting the ink.

5 Claims, 4 Drawing Sheets

FIG.3(a)
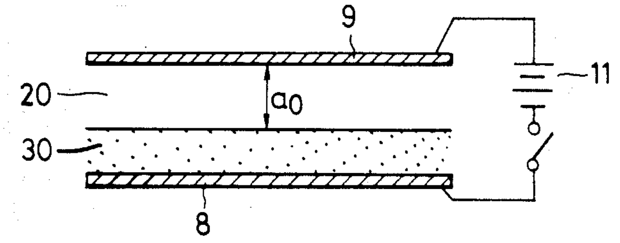
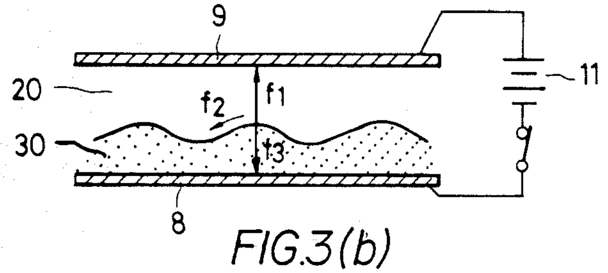
FIG.3(b)
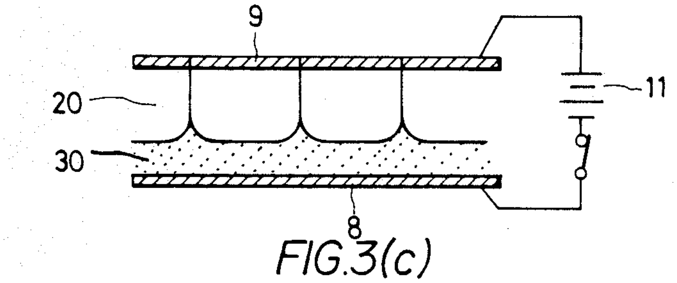
FIG.3(c)

THERMAL ELECTROSTATIC INK-JET RECORDING METHOD AND AN INK THEREFOR

BACKGROUND OF THE INVENTION

The present invention relates to thermal electro-static ink-jet recording, and particularly to a method for such-recording using an ink which has physical properties appropriate for stabilizing the thermal electrostatic ink-jet recording operation to prevent erroneous jetting of the ink, while operating at high speed.

Examples of conventional non-impact ink-jet recording apparatus include an apparatus in which electrostriction elements, such as piezo-electric elements or the like, are provided in an ink chamber, and the ink pressure within the ink chamber is raised by applying a voltage of a predetermined frequency to the elements so that a drop of ink can be jetted from an orifice of the ink chamber.

Such non-impact ink-jet recording methods have advantages compared to impact recording methods in that noise is reduced during operation and a special process, such as of photographic fixing, is not required, because the recording is accomplished by deposition of ink droplets on paper.

However, conventional ink-jet recording apparatus has structural limitations, e.g., in miniaturizing the ink-jet mechanism of the ink chamber provided with the electrostriction elements. Further, it is difficult to obtain a predetermined pel density, and mechanical scanning is required. Accordingly, there are limitations on improving the printing speed. Furthermore, problems such as an ink-clogging of the orifice can occur.

To overcome such disadvantages, several kinds of ink-jet recording apparatuses, for example, (1) the magnetic ink-jet system, (2) the plane scanning ink-jet system, (3) the thermal bubble ink-jet system, (4) the electrostatic attraction ink-jet system, and others, have been proposed. The first, the magnetic ink-jet system, employs an array of magnetic electrodes disposed at intervals corresponding to pel density. The array is driven in response to a pel signal to generate a magnetic field so as to thereby form a meniscus structure of ink, and an electrostatic field is applied to the meniscus to jet ink. In the second, the plane scanning ink-jet system, a slit-like ink reservoir is provided in parallel to an array of electrodes disposed at intervals corresponding to pel density. An electric field pattern corresponding to a pel signal is formed between the electrode array and an electrode disposed opposite the electrode array behind a recording paper. On the basis of the electric field pattern, ink is jetted from the ink reservoir. In the third, the thermal bubble ink-jet system, an array of heating elements is disposed at intervals corresponding to pel density so that ink is heated in response to an image signal to produce surface boiling (500° to 600° C.) to raise the pressure within an orifice so as to jet a drop of ink. In the fourth, the electrostatic attraction ink-jet system, ink is electrically attracted by an electric field created in response to an image signal. At the same time, a stream of air is applied to the ink to jet the ink.

The ink-jet recording apparatuses of the systems of the above first, third and fourth types have an advantage in that high-speed recording can be accomplished because the-ink is jetted by the cooperative action of a magnetic field pattern (or electric field pattern) formed in response to an image signal and an electric field (or airflow). The ink-jet recording apparatus of the second of the above systems has the advantage of avoiding ink-clogging because an orifice for jetting the ink is not required.

However, these ink-jet recording apparatuses have disadvantages as follows. With the magnetic ink-jet system color imaging is difficult because magnetic material for magnetizing ink is contained in the ink. Because the signal voltage level should be high in the plane scanning ink-jet system, an electric field is often formed at a non-selected part of the array. Accordingly, there is a possibility of erroneous ink jetting. Furthermore, because resting time is long, the recording speed cannot be made sufficiently high. In the thermal bubble ink-jet system there is a possibility of shortening the lifetime of the heating elements because of cavitation caused by appearance and disappearance of air bubbles. In the electrostatic attraction ink-jet system, because the ink attraction voltage level should be high, it is difficult to integrate driving elements at intervals corresponding to pel density. Accordingly, when a matrix driving method is employed, the recording speed can not be made sufficiently high.

In view of the aforementioned disadvantages of the above-mentioned ink-jet recorders, there has also been proposed a thermal electrostatic ink-jet recording apparatus superior in durability, in jetting accuracy, in color imaging, and in recording speed.

The latter thermal electrostatic ink-jet recording apparatus is effectuated through a process in which the surface tension, interfacial tension, viscosity, and electric resistance of electrically resistive or conductive ink are lowered to form a meniscus of ink, and an electric field is concentrated on the meniscus to thereby jet the ink from the orifice.

In this thermal electrostatic ink-jet recording apparatus, however, there is a possibility of erroneous jetting of ink from a non-heated part of the recording head, not in response to an image signal, when conditions inappropriate for jetting ink are set. Accordingly, a disadvantage is such that printing quality may deteriorate due to the erroneous ink jetting.

SUMMARY OF THE INVENTION

It is therefore an object of the present invention to overcome the above-mentioned disadvantage of thermal electrostatic ink jet recording.

It is another object of the present invention to achieve improved thermal electrostatic ink-jet recording using an ink, which has appropriate physical properties to make it possible to easily set conditions appropriate for jetting ink.

The "appropriate physical properties," as herein used, are achieved when a nondimensional parameter l, as determined by the following equation, has a value (1) not larger than 100 at a temperature of 20° C. and (2) not smaller than three times as large as the value thereof at 20° C. at a temperature within a range of from 70° C. to 200° C.:

$$l = \frac{\rho}{\mu}\sqrt{\frac{\alpha a_0}{\rho'}}$$

where $\rho$, $\mu$ and $\alpha$ represent, respectively, the density kg/m$^3$), the viscosity (N·sec/m$^2$) and the surface tension (N/m) of the ink, $a_0$ represents the distance (m) of a gap to which the electric field is applied, and $\rho'$ represents the density (kg/m$^3$) of air.

As used hereinafter, the term "l value " or "value of l" for a particular ink shall mean l, as determined by the foregoing equation, for that particular ink at the indicated temperature.

BRIEF DESCRIPTION OF THE DRAWINGS

The manner in which the above and other objects, features, and advantages of the present invention are achieved and the invention itself will be better understood from reading the following detailed description of a preferred embodiment thereof in conjunction with accompanying drawings, in which:

FIGS. 3(*a*) to 3(*c*) are schematic drawings, in part sectional, explaining an electrofluid-dynamic phenomenon regarded as the theory of thermal electrostatic ink jetting;

FIG. 6 is a series of plots showing a theoretical explanation of the behavior of the ink according to the invention.

DETAILED DESCRIPTION OF THE INVENTION

Figure 1:
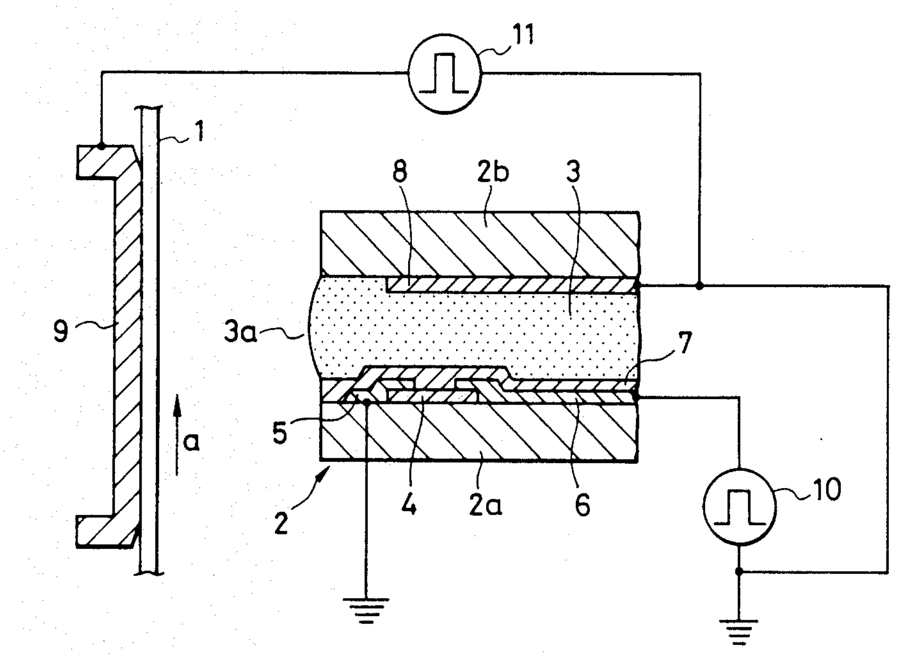
FIG. 1 is a schematic drawing, in part sectional, showing a recording apparatus using the method and ink according to the present invention.

Referring to FIG. 1, there is shown a thermal electrostatic ink-jet recording apparatus for use with the method and ink of the present invention. The apparatus comprises a recording head 2, power sources 10 and 11, electrodes 5, 6, 8 and 9 and associated circuitry as hereinafter described. Recording paper 1 is arranged so as to be movable in the direction of the arrow "a" (that is, in the subscanning direction) step by step. An ink chamber 3 is formed in recording head 2 by a pair of wall members 2*a* and 2*b* extending in the main-scanning direction. On the inner surface of one wall member 2*a*, there are provided a plurality (not shown) of spaced apart driving electrodes 6 which are electrically connected to a common electrode 5 in the main-scanning direction to form an array. A protecting layer 7 is disposed over the surfaces of the electrodes 5 and 6. An induction electrode 8, having its front end, i.e., the end toward the orifice 3*a*, disposed at a predetermined distance away from the liquid surface of ink held in the orifice, is provided on the inner surface of the other wall member 2*b*. A counter electrode 9 is provided behind the recording paper 1. A driving circuit 10 is provided between the common electrode 5 and the respective driving electrode 6, for supplying electric current at a predetermined level to at least one selected electric resistance heating element 4 when the image signal is "1". Thus, thermal energy is applied to a selected portion of the ink in chamber 3. An electric source 11 for forming an electric field for jetting ink is provided between the induction electrode 8 and the counter electrode 9. Thus, electric energy is applied to the ink in chamber 3 within the electric field so formed.

Figure 2:
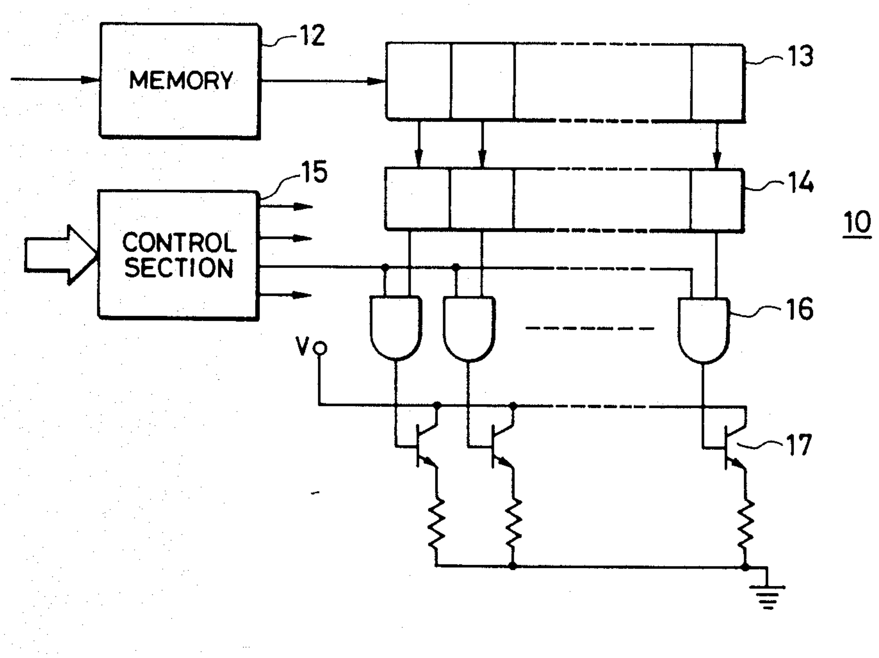
FIG. 2 is a schematic drawing showing the driving circuit employed in the apparatus shown in FIG. 1.

Referring to FIG. 2, there is shown a driving circuit 10 constituted by a shift register 13 arranged to receive an image signal serially from an image memory 12. A latch circuit 14 is provided for latching the signal condition of the shift register 13, AND circuits 16 are arranged to receive an enabling image signal from a control section 15 so as to output "1" or "0" in response to the bit condition ("1" or "0") of the respective bits of the latch circuit 14. Transistors 17 are switched on by "1" of the corresponding AND circuits 16 to thereby apply a voltage V to the corresponding heating element(s) 4 to cause them to generate heat which is applied to that portion of the ink surrounding the corresponding heating elements.

The operation of the circuit of FIG. 2 is as follows:

When the serial image signals are fed to the shift resistor 13 from the image memory 12, the latch circuit 14 latches the signals. Upon reception of an enabling signal from the control section 15, the respective AND circuit 16 generates a driving signal corresponding to the image signal in the associated bit of the shift register 13 in synchronism with the enabling signal. In response to the driving signal, the corresponding transistor 17 is turned on so that the voltage V is applied to the corresponding heating element(s) 4. In the image section, ink at the orifice 3*a* is heated to form a meniscus. At the same time, the ink is drawn toward electrode 9 due to electrostatic attraction resulting from the applied electric field (that is, by application of a pulse by means of the electric source 11). Thus, ink is jetted from the orifice and deposited on the recording paper 1.

In such a recording operation, printing conditions were tested with the use of various inks having different physical properties shown in Table 1 for the temperatures indicated therein. The results were as shown in Table 1. In the test, ink was adjusted by a resistance adjusting agent so as to set its volume resistivity to a value not larger than $1\times10^{10}$ [$\Omega$-cm]. The gap distance $a_0$ between the induction electrode 8 and the counter electrode 9, to which an electric field was applied, was selected to be 300 $\mu$m. The air density was selected to be 1.21 kg/m$^3$. The l value, as defined hereinabove, was determined for each of the inks using the above-mentioned equation and is shown in Table 1.

TABLE 1

| Main Solvent | Temp. °C. | Viscosity $\mu$ N · sec/m$^2$ | Surface $\alpha$ tension N/m | Density $\rho$ kg/m$^3$ | Value of l | Ratio of l | Results |
|---|---|---|---|---|---|---|---|
| Fluid paraffin base (1) | 20 | $90 \times 10^3$ | $31 \times 10^3$ | $0.90 \times 10^3$ | 28 | 1 | |
| | 80 | $9.0 \times 10^{-3}$ | $27 \times 10^{-3}$ | $0.85 \times 10^3$ | 240 | 8.5 | Operable. Flying at non-heated occurred. |

TABLE 1-continued

| Main Solvent | Temp. °C. | Viscosity $\mu$ N · sec/m$^2$ | Surface $\alpha$ tension N/m | Density $\rho$ kg/m$^3$ | Value of l | Ratio of l | Results |
|---|---|---|---|---|---|---|---|
| | 160 | $2.0 \times 10^{-3}$ | $20 \times 10^{-3}$ | $0.83 \times 10^3$ | 920 | 32.8 | Operable. |
| Fluid paraffin base (2) | 20 | $220 \times 10^{-3}$ | $27 \times 10^{-3}$ | $0.90 \times 10^3$ | 11 | 1 | |
| | 80 | $15 \times 10^{-3}$ | $22 \times 10^{-3}$ | $0.85 \times 10^3$ | 130 | 11.8 | Operable. |
| | 160 | $2.5 \times 10^{-3}$ | $18 \times 10^{-3}$ | $0.83 \times 10^3$ | 700 | 63.6 | Operable. |
| Poly-hydric alcohol base | 20 | $65 \times 10^{-3}$ | $33 \times 10^{-3}$ | $1.1 \times 10^3$ | 48 | 1 | |
| | 80 | $10 \times 10^{-3}$ | $27 \times 10^{-3}$ | $1.1 \times 10^3$ | 280 | 5.8 | Flying at non-heated occurred. |
| | 160 | $2.0 \times 10^{-3}$ | $24 \times 10^{-3}$ | $1.0 \times 10^3$ | 25.0 | Operable. | |
| | | | | 1200 | | | |
| Water | 20 | $1 \times 10^{-3}$ | $58 \times 10^{-3}$ | $1.0 \times 10^3$ | 1 | | |
| | | | | 3800 | | | |
| base (1) | 80 | $0.35 \times 10^{-3}$ | $46 \times 10^{-3}$ | $0.97 \times 10^3$ | 2.5 | Inoperable | |
| | | | | 9400 | | | |
| Water base (2) | 20 | $4.5 \times 10^{-3}$ | $37 \times 10^{-3}$ | $1.1 \times 10^3$ | 670 | 1 | |
| | 80 | $1.5 \times 10^{-3}$ | $30 \times 10^{-3}$ | $0.97 \times 10^3$ | 2.6 | Inoperable | |
| | | | | 1800 | | | |
| Water + poly-ethylene glycol base | 20 | $4.0 \times 10^{-3}$ | $40 \times 10^{-3}$ | $1.1 \times 10^3$ | 87 | 1 | |
| | 80 | $9 \times 10^{-3}$ | $27 \times 10^{-3}$ | $1.1 \times 10^3$ | 320 | 3.6 | Operable Flying at non-heated occurred. |

from Table 1 that, when an ink has (1) an l value not larger than about 100° at 20° C. and (2) an l value at a temperature within a range of from 70° C. to 200° C. not less than three times the value at 20° C., the recording operation can be conducted with jetting of the ink. It is preferred, however, that the ink has an l value, at a temperature within a range of from 70° C. to 200° C., not less than about nine times the l value at 20° C., to prevent erroneous ink jetting from the non-heated part of the recording head to thereby provide a stable recording operation.

Before this conclusion was drawn, the following investigation was made.

FIGS. 3(*a*) to 3(*c*) are diagrams useful for explaining the phenomenon of jetting ink from the surface of ink 30. A quantity of ink 30 capable of responding to electrostatic induction in an electric field established between the upper electrode (attraction electrode) 9 and the lower electrode (induction electrode) 8, is arranged in a gap 20. A voltage from the electric source 11 is applied across electrodes 8 and 9 to establish an electric field which, in turn, applies an electrostatic force to the ink 30 (FIG. 3*a*). Although the ink 30 is attracted toward the attraction electrode 9 by the electrostatic force, a surface wave is formed due to the incompressibility of the ink (FIG. 3*b*). Although the electrostatic force ($f_1$) is concentrated on the peak portion of the wave because of the electric field concentration, drag against the surface wave occurs due to the surface tension force ($f_2$) and gravity ($f_3$). When the ink 30 moves the visous drag also acts on the surface wave.

In the case where the electrostatic force is sufficiently strong, however, the surface wave becomes an unstable growing wave so that the ink is drawn toward the attraction electrode 9 like a thread or jetted as a liquid drop (FIG. 3*c*). This phenomenon can be explained by electrofluid dynamics according to perturbation development as described in J. R. Melcher, "FIELD COUPLED SURFACE WAVES" MIT PRESS (USA), 1963, and in Y. O. Tu, "IBM J. Res. Develop.", pp. 514–522, November 1975.

Figure 4:
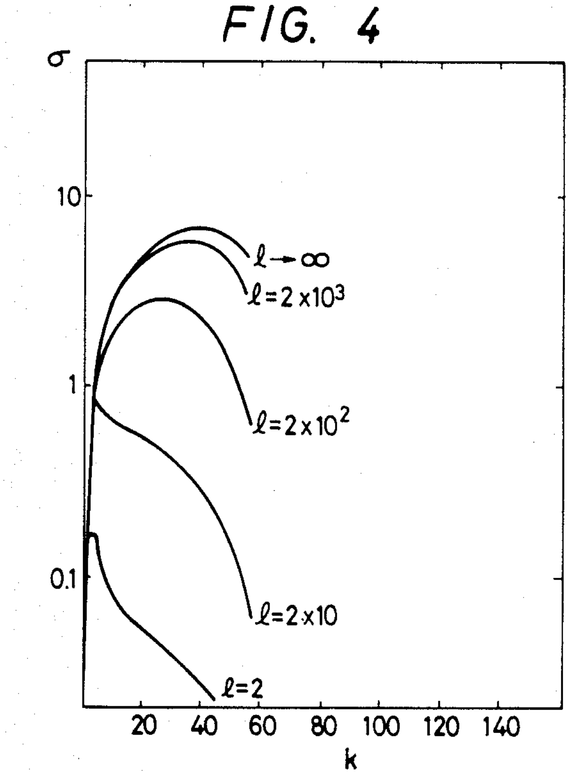
FIG. 4 is a series of plots illustrating the functional relationship of various physical properties of ink and air theoretically affecting the electrofluid dynamics of an ink.

According to Melcher and Tu, the equation of motion with respect to ink under the condition as shown in FIGS. 3*a* to 3*c* is represented by Navier-Stokes equations relevant to a fluid. The balance of stress tension between the electrostatic force and the surface tension exists in the interface of the air layer and the ink layer. On the assumption that perturbation development of exp [ikr +nt]; where r is the value of coordinates and i is an imaginary quantity can be made on physical properties, such as velocity vector, pressure, electrostatic potential and the like, of the air and ink corresponding to the transformation of the ink wave surface, a functional relation between n and k (=/k/) can be found after calculation to the linearly developed terms of perturbation in the equation. The functional relation is shown in FIG. 4. A nondimensional quantity l is parameterized as a theoretical solution based upon electrofluid dynamics and expressed by the co-ordinates (with k as the abscissa and $\sigma$ as the ordinate)

$$k = \frac{2\pi a_0}{\lambda}, \; \sigma = \sqrt{\frac{\rho_1 a_0^3}{\alpha}} \cdot n$$

where $\rho$ represents the air density (1.21 kg/m$^3$), $a_0$ represents the gap distance [m], $\alpha$ represents the surface tension [N/m] of ink, $\mu$ represents the static viscosity [N·sec//m$^2$] of ink, $\rho$ represents ink density [kg/m$^3$], $\epsilon$ represents the dielectric constant ($8{\cdot}85 \times 10^{-12}$ F/m) of the air (vacuum), V represents impressed voltage [VOLT], $\lambda$ represents the wavelength [m] of the surface wave, and n represents the growing rate [sec$^{-1}$] of the ink surface wave.

On the assumption that thermal electrostatic ink-jet operation might be expressed by the liquid surface growing rate given by the theory of electrofluid dynamics, an investigation was made of practical ink-jet operation. As that result, the following relations were found.

(1) When thermal energy is not applied to the ink but an electric field pulse for jetting ink is applied to the ink, the ink is jetted as a substantially regular interval dot train though the liquid surface of ink has been even before the electric field pulse is applied to the ink.

(2) When the time of the impressed voltage pulse is elongated, the dot train is arranged in a line.

(3) The interval of the dot train as described in (1) approximately corresponds to the wavelength $\lambda_{max}$ ($2\pi a_0/k_{max}$) when the ink growing rate n takes a maximum value $n_{max}$.

(4) The voltage impression time ta required for jetting the ink decreases as nmax increases.

Figure 5:
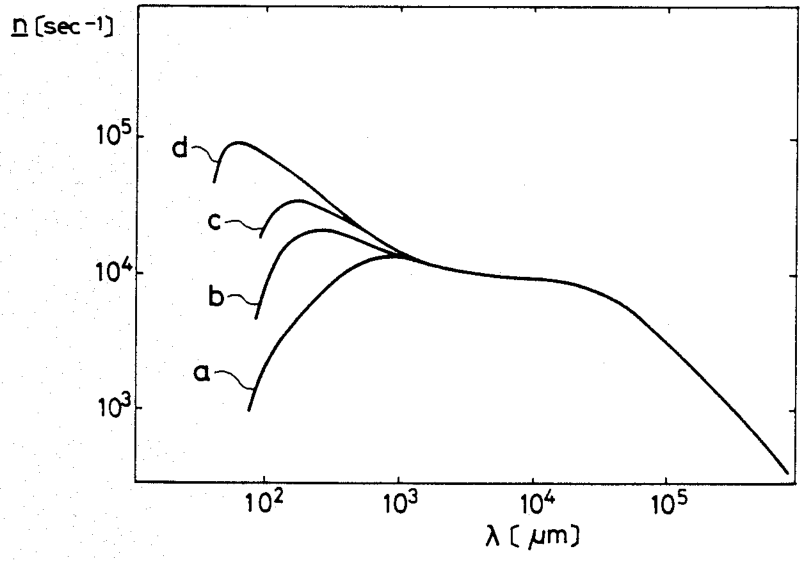
FIG. 5 is a series of plots illustrating the theoretical relationship between the wavelength of an ink surface wave and its growth rate for various surface tensions and viscosities.

FIG. 5 shows the relation between the wavelength λ of the ink surface wave and the ink growing speed n in the ink having a specific gravity of about 0.9 g/cm³, where the gap distance $a_0$ is 300 μm, and the voltage V is 300 V. Surface tension and viscosities of the inks represented by curves a to d of FIG. 5 are as shown in Table 2.

TABLE 2

| Curve | Surface tension α[dyne/cm] | Viscosity μ[cps] |
|---|---|---|
| a | 27 | 220 |
| b | 33 | 30 |
| c | 37 | 5 |
| d | 15 | 1 |

Ink materials having the curves a to d were estimated under the same condition to thus attain the results of Table 3.

TABLE 3

| Ink | λmax | Dot interval | $n_{max}$ | Pulse impression time |
|---|---|---|---|---|
| a | 650 μm | ~800 μm | 1.3 × 10⁴ | ~3 msec |
| b | 210 μm | ~220 μm | 2.0 × 10⁴ | ~1.5 msec |
| c | 180 μm | ~180 μm | 3.5 × 10⁴ | ~300 μsec |
| d | 60 μm | ~80 μm | 1.0 × 10⁵ | ~100 μsec |

In the thermal electrostatic ink-jet operation, the ink does not maintain uniform physical properties. The viscosity and surface tension of the ink vary place by place. Accordingly, the theoretical solution in each of FIGS. 4 and 5 can not be applied precisely to the ink-jet operation. However, the following fact was found as the result of examination with the use of a recording head capable of heating ink from a room temperature 20° C. to about 180° C. in response to an image signal.

Figure 6:
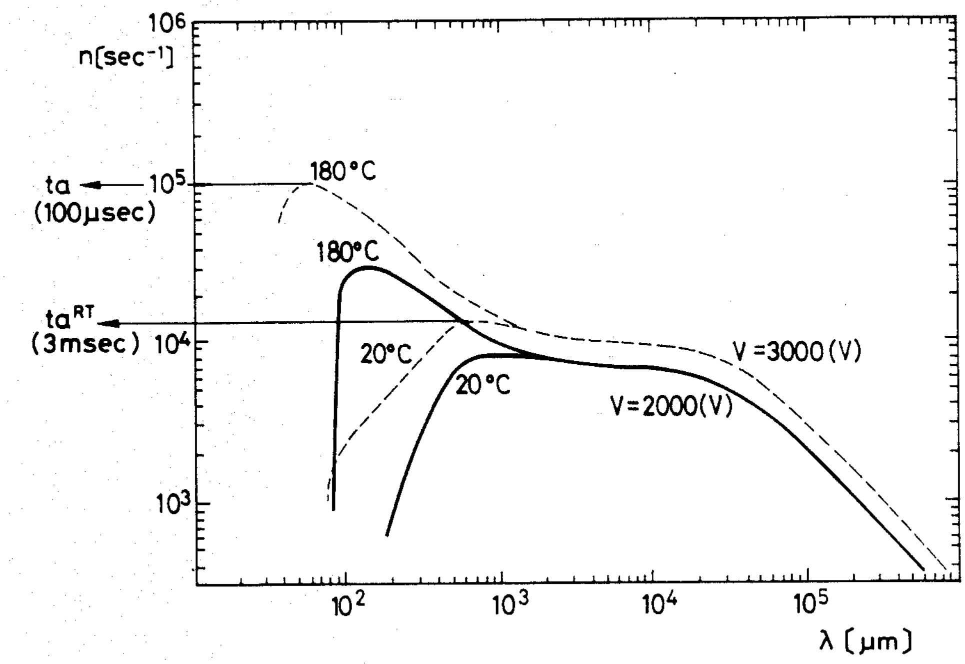
FIG. 6 is a series of plots illustrating the relationship of the thermal eletrostatic ink-jet phenomenon and the electrofluid

From the ink growing rate $n(\lambda)_{RT}$ corresponding to the wavelength calculated on the basis of the physical properties $\mu_{RT}$ (viscosity), $\rho_{RT}$ (surface tension) and $\alpha_{RT}$(density) of ink at the room temperature and the ink growing rate $n(\lambda)_{HT}$ corresponding to the wavelength calculated by the physical properties of ink at a high temperature, a relation of ink attraction on electrofluid dynamics as shown in FIG. 6 can be calculated. Typically, the dot train attraction start time $t_a^{RT}$ at a low temperature and the dot train attraction start time $t_a^{HT}$ at a high temperature can be calculated. It was found that good thermal electrostatic ink-jet recording could be made when the electric field impression time required for producing ink attraction was between $t_a^{RT}$ and $t_a^{HT}$.

FIG. 6 is a view for explaining the thermal electrostatic ink-jet phenomenon in relation to the electrofluid dynamic phenomenon when the impressed voltage V is 2000 or 3000 [V], the gap distance $a_0$ is 300 82 m, and the viscosity μ, the surface tension α, and the density ρ, at each of 20° C. and 180° C. are as follows.

| | 20° C. | 180° C. |
|---|---|---|
| μ | 220 cps | 1 cps |
| α | 27 dyne/cm | 15 dyne/cm |

-continued

| | 20° C. | 180° C. |
|---|---|---|
| ρ | 0.9 g/cm³ | 0.9 g/cm³ |

It is apparent from FIG. 6 that, when the impressed electric field is 3000 V/300 μm, the permissible impression time is from 100 μ sec to 3 msec. As the result of jetting test with the use of a thermal electrostatic ink-jet head capable of heating the free surface of ink to about 180° C. (according to the measurement with an infrared microscope, RM-2A, made by Nihon Barnes Co.), jetting started after about 200 μ sec and jetting from the back portion (non-heated portion) was induced after the passage of 2.5 msec.

The same examination was repeated upon different ink materials, and the aforementioned interpretation was found to be fundamentally applicable for each ink. It was concluded that the operation mechanism in the thermal electrostatic ink-jet system can be limited by the temperature change for dispersion relation n(λ) with respect to the unsteady-state growing rate of a field-coupled wave on electrofluid dynamics.

Accordingly, in order to perform thermal electrostatic ink-jet operation securely and speedily, it is necessary to choose ink permitting a large temperature change for n(λ) and having a large value of n. Because the aforementioned physical properties of ink influence n(λ), it is found that the maximum value $n_{max}$ of the growing rate should vary between the high-temperature part and the low-temperature part by three times or more in order to satisfactorily control the thermal electrostatic operation and jet ink from only the heated part of ink. When converted into the ink jetting start time ta, the magnitude of the change corresponds to the range from such a three-fold value to a ten-fold value.

It is apparent from FIG. 4 that the factor giving the temperature change for n(λ) is a nondimensional parameter l represented by the equation:

$$l = \frac{\rho}{\mu}\sqrt{\frac{\alpha a_0}{\rho'}}$$

when n and λ are as follows in FIG. 4:

$$n = \frac{\sigma}{\sqrt{\frac{\rho' a_0^3}{\alpha}}}, \quad \lambda = \frac{2\pi a_0}{k}$$

Figure 7:
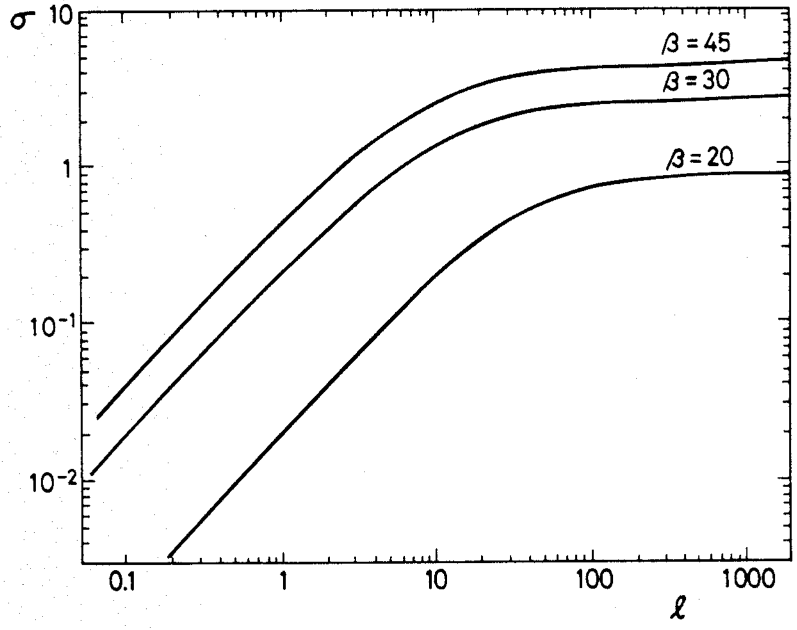

To simplify the equation, the relation of the velocity with respect to the above-mentioned parameter l shown in FIG. 7. FIG. 7 is a view with the electric field intensity β as a parameter, the electric field intensity being as follows:

$$\beta = \frac{3\epsilon}{\alpha a_0} v^2$$

In the case of β=20, the jetting rate σ proportional to the growing rate n becomes saturated after about l=100. In the above-mentioned equation of β, ε the dielectric constant of the air (vacuum) as described above.

Generally, when ink is heated to a high temperature, both the viscosity and surface tension of the ink are lowered. However, the lowering of viscosity is more marked. Accordingly, the value of l generally increases. Because ink having the value of l larger than 100 at a room temperature loses the benefit of good thermal change for the value of l, the ink can not be used for thermal electrostatic ink-jet recording.

On the other hand, it is apparent from FIG. 7 that, when the value of is not larger than 10, the value of l should change three times in order to produce the necessary difference (three times) of n experimentally found because l is inversely proportional to $\sigma$. Of course, the degree of the change of l can be changed corresponding to the temperature difference due to heating. However, because the environmental temperature and inside temperature of the thermal electrostatic ink-jet recording apparatus change, it is preferable from the view of printer reliability that the temperature difference is established to be larger, as long as the greater consumption of electric power an be permitted in the thermal head.

The preferred temperature range for the heated part of the ink is from 70° C. to 200° C. due to the possibility of environmental temperature change and reduction in the consumption of electric power.

Accordingly, on the assumption that the room temperature is 20° C., ink having an l value which increases by at least three times at a temperature between 70° C. and 200° C. is suitable for thermal electrostatic ink-jet recording. Of course, in the case where the ink used is a low boiling point ink (for example, water base ink), the ink can be used at a temperature not higher than the boiling point (for example, not higher than 100° C.) as long as the value of l is three times larger at the higher temperature of operation. As the value becomes larger, thermal contrast becomes higher to improve the stability of system. The aforementioned conclusion has been drawn on the basis of the results of Table 1.

As described above, when using the thermal electrostatic ink-jet recording method of the present invention, conditions appropriate for jetting the ink can be easily established.

Having described preferred embodiments of the present invention, modifications and variations thereof will become apparent and the scope of the invention is limited only by the appended claims.

In the system of the thermal electrostatic ink-jet recording, the ink in chamber is partially heated at a temperature of 200° C.–250° C. to thereby lower the viscosity of the ink for jetting. Therefore, this system requires an ink having good stability in heat-resistance. However, the conventional ink-jet recording system uses water ink or oil ink which has less efficiency of heat-resistance. Further, an ink used in the bubble ink-jet system has also less efficiency of heat-resistance. Therefore, the thermal electrostatic ink-jet recording system cannot use such an ink employed in the conventional system, since solvent contained in the ink may be vaporized by the heat or, in an extreme case, the solvent may be ignited to cause a fire.

Accordingly, the system of the invention requires an ink having a good efficiency of heat-resistance at a temperature higher than at least 250° C. in order to prevent the ink from vaporizing due to the heat. The system of the invention may use any ink having the above-described efficiency of the heat-resistance. Such an ink may preferably be an oil ink mainly containing high boil organic solvent, the content thereof being 20 to 90 parts by weight. In such an organic solvent, particularly, naphthalene, tetralin and derivatives thereof are preferable in view of solubility and dispersion ability of dye and pigment used as colorant.

Specific examples of naphthalene and the deviatives thereof include naphthalene, isopropylsubstituted naphthalene, mono-substituted naphthalene, di-substituted naphthalene, tri-substituted naphthalene, and tetra-substituted naphthalene. More specifically, in the mono-substituted naphthalene, there are 1-isopropyl naphthalene, 2-isopropyl naphthalene and 3-isopropyl naphthalene. In the di-substituted naphthalene, there are 2,5-diisopropyl naphthalene, 2,6-diisopropyl naphthalene, 1,3-diisopropyl naphthalene, 1,4-diisopropyl naphthalene, 1,5-diisopropyl naphthalene and the like. In these isopropyl-substituted naphthalene, for example, 2,7-diisopropyl naphthalene has a good heat-resistance at a temperature higher than 280° C., a surface tension of which is at 38 dyne/cm at 25° C., and vapor pressure of which is at l mmHg at ordinary temperatures and that at 10 mmHg at 150° C.

Further, specific example of tetralin and the deviatives thereof include tetralin, mono-substituted tetralin, di-substituted tetralin, tri-substituted tetralin and tetra-substituted tetralin. More specifically, in the mono-substituted tetralin, there are 1-isopropyl tetralin, 2-isopropyl tetralin and 3-isopropyl tetralin. In the di-substituted tetralin, there are 2,5-diisopropyl tetralin, 2,6-diisopropyl tetralin, 2,7-diisopropyl tetralin, 1,3-diisopropyl tetralin, 1,4-diisopropyl tetralin, 1,5-diisopropyl tetralin and the like. These isopropyl-substituted tetralin have physical properties which is approximate to that of the above-described isopropyl-substituted naphthalene with respect to heat resistance, viscosity characteristics, surface tension, vapor pressure and nonpoison. 2,6-diisopropyl tetralin, for example, is less than 1 mmHg in vapor pressure at ordinary temperatures.

The ink may preferably contain, as a viscosity control agent, a higher fatty acid such as linoleic acid, oleic acid and the like, the content thereof being 5–40 parts by weight. The oleic acid has a good heat-resistance at a temperature higher than 300° C. and a surface tension of which is 33 dyne/cm at 20° C. The linoleic acid also has a good heat-resistance at a boiling point of 229°–230° C.

Further, another organic solvent such as xylene, toluene, decane or dodecane, or higher alcohol such as cetyl alcohol and the like may be included in the ink in order to control the viscosity of the ink composition. Thus, a predetermined viscosity characteristics can be obtained by suitably combining the above solvents.

Another component may be included into the ink, such as dye or pigment. Specifically, for example, phthalocyanine series dye, carbon black, anthraquinone series dye and the like may be applicable for a component of the ink.

Furthermore, the ink may contain a conductive material such as a carbon, an iron chloride, and the like for obtaining conductivity, a dispersion stabilizer for stabilizing the dispersion of the dye or pigment, a surface active agent for controling the surface tension of the composition, a mold inhibitor, an insecticide, and the like.

What is claimed is:

1. In the method of recording an image on a recording medium in which thermal energy is selectively applied locally to selected portions of an ink in response to image signals to heat said selected portions, and an electrostatic field is applied to said ink to cause ink to be jetted from the selectively heated portions onto a recording medium, the improvement comprising using as said ink an ink having an l value at 20° C. not larger than 100 and an l value at a temperature in the range between 70° C. and 200° C. not less than about three times said l value at 20° C., wherein $$l = \frac{\rho}{\mu}\sqrt{\frac{\alpha a_0}{\rho'}}$$

and $\rho$, $\mu$ and $\alpha$ represent, respectively, the density ($kg/m^3$), the viscosity ($n \cdot sec/m^2$) and the surface tension (N/m) of the ink, $a_0$ represents the distance (m) of a gap to which the electric field is applied, and $\rho'$ represents the density ($kg/m^3$) of air.

2. The method of claim 1, wherein said ink contains 20 to 90 parts by weight of a high boiling organic solvent.

3. The method of claim 2, wherein said organic solvent is selected from the group consisting of naphthalene, tetralin and derivatives thereof.

4. The method of claim 1, wherein the l value of said ink at a temperature in the range between 70° C. and 200° C. is not smaller than about nine times said l value at 20 C.

5. The method of claim 1, wherein the l value of said ink at a temperature in the range between 70° C. and 200° C. is between about three and about sixty times said l value at 20 C.

* * * * *